United States Patent
Tomita (10) Patent No.: US 6,886,068 B2
(45) Date of Patent: Apr. 26, 2005

(54) DISK ARRAY APPARATUS AND DATA UPDATE METHOD FOR STORING TAG BLOCKS

(75) Inventor: Haruo Tomita, Iruma (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 326 days.

(21) Appl. No.: 10/231,157

(22) Filed: Aug. 30, 2002

(65) Prior Publication Data

US 2003/0115437 A1 Jun. 19, 2003

(30) Foreign Application Priority Data

Dec. 18, 2001 (JP) ........................................ 2001-384822

(51) Int. Cl.⁷ .............................................. G06F 12/00
(52) U.S. Cl. ............................ 711/4; 711/114; 711/157; 711/206
(58) Field of Search ................................ 711/206, 207, 711/4, 114, 157

(56) References Cited

U.S. PATENT DOCUMENTS 6,219,752 B1   4/2001  Sekido 6,233,648 B1   5/2001  Tomita

FOREIGN PATENT DOCUMENTS

| JP | 11-194899 | 7/1999 |
| JP | 2000/010738 | 1/2000 |
| JP | 2001-51806 | 2/2001 |
| JP | 2001-243021 | 9/2001 |

OTHER PUBLICATIONS

Rosenblum et al., "The Design and Implementation of a Log–Structured File System," ACM Transactions on Computer Systems (Feb. 1992), pp. 1–15.

U.S. Appl. No. 10/231,027, filed Aug. 30, 2002, to Tomita.

U.S. Appl. No. 10/231,247, filed Aug. 30, 2002, to Tomita.

U.S. Appl. No. 10/231,349, filed Aug. 30, 2002, to Tomita.

*Primary Examiner*—Jack A. Lane
(74) *Attorney, Agent, or Firm*—Finnegan, Henderson, Farabow, Garrett & Dunner, L.L.P.

(57) ABSTRACT

In writing all logical blocks in a data stripe in a disk array, a controller generates a logical address tag block corresponding to these logical blocks. The controller stores the logical address tag block in logical address tag block areas ensured other than data areas on the disk array which store the data stripe.

2 Claims, 10 Drawing Sheets

ADDRESS TRANSLATION TABLE

| LOGICAL ADDRESS | ST# | BLK# | TS# |
|---|---|---|---|
| L0 | 100 | 3 | 99 |
| L1 | 1000 | 4 | 999 |
| L2 | 1 | 5 | 21 |
| ⋮ | | | |
| Ln | | | |

DISK ARRAY APPARATUS AND DATA UPDATE METHOD FOR STORING TAG BLOCKS

CROSS-REFERENCE TO RELATED APPLICATIONS

This application is based upon and claims the benefit of priority from the prior Japanese Patent Application No. 2001-384822, filed Dec. 18, 2001, the entire contents of which are incorporated herein by reference.

BACKGROUND OF THE INVENTION

1. Field of the Invention

The present invention relates to a disk array apparatus having a disk array constituted by a plurality of disk drives, and a data update method in the disk array apparatus.

2. Description of the Related Art

Conventionally, a disk storage management method called a log-structured file system has been known. The log-structured file system is described in detail in, e.g., Mendel Rosenblum and John k. Ousterhout, "The Design and Implementation of a Log-Structured File System", ACM Transaction on Computer Systems, February 1992. The log-structured file system described in this reference can be summarized as a method of writing a plurality of updated data altogether in contiguous areas which do not store valid data and are different from old areas, and invalidating the old areas where the valid data have been stored before updating.

U.S. Pat. No. 6,219,752 and No. 6,233,648 disclose a technique in which the log-structured file system is applied to a disk array apparatus (to be referred to as a prior art, hereinafter). In this prior art, when receiving an update (write) request from a host computer, contents in the storage area of old data to be updated are not normally rewritten, and the updated data is stored in a buffer first. When updated data with a predetermined quantity are stored in the buffer, these updated data are written in empty areas other than the area of the old data on the plurality of disk drives in bulk, that is, en bloc. Such a write method is called as a delay write method.

In the prior art described above, when the logical address designated by an access request from the host computer is to be translated into a physical address on the disk array, an address translation table is used. To construct this address translation table requires a logical address tag block. The logical address tag block contains logical addresses of a plurality of logical blocks which make up data to be written in bulk (data of one stripe), and a time stamp for representing a time order that these data are written.

In the prior art described above, the logical address tag block is treated as a part of data to be written in bulk (data of one stripe). Logical address tag blocks contained in these data cannot be obtained unless data for all stripes are loaded from the disk array. Therefore, when an address translation table is reconstructed by using logical address tag blocks in a case wherein, e.g., an abnormality occurs, the reconstruction process requires a very long period of time.

The logical address tag block in the above-described prior art is written midway along the plurality of physically contiguous data blocks on the disk array. Thus, when the plurality of physically contiguous data blocks are to be read out from the disk array, the logical address tag block present midway along the data blocks inhibits efficient data readout operation.

BRIEF SUMMARY OF THE INVENTION

It is an object of the present invention to provide a disk array apparatus which can read out logical address tag blocks for each stripe in bulk, and a data update method in the disk array apparatus.

According to a first aspect of the present invention, there is provided a disk array apparatus having a disk array which is constituted by a plurality of disk drives and detected by a host computer as one logical disk drive, comprising tag generation means for generating logical address tag blocks each containing logical addresses corresponding to all logical blocks in one data stripe written in the disk array, and tag write means for writing the logical address tag blocks generated by the tag generation means in specific areas ensured other than data areas on the disk array which store the data stripe.

According to a second aspect of the present invention, there is provided a disk array apparatus having a disk array which is constituted by a plurality of disk drives and detected by a host computer as one logical disk drive, comprising tag generation means for generating logical address tag blocks each containing logical addresses corresponding to all logical blocks in one data stripe written in the disk array, a buffer which stores each of the logical address tag blocks generated by the tag generation means, and tag write means for, when logical address tag blocks of one stripe are stored in the buffer, writing the logical address tag blocks in specific areas in the disk array in bulk.

According to a third aspect of the present invention, there is provided a disk array apparatus having a disk array which is constituted by a plurality of disk drives and detected by a host computer as one logical disk drive, and looking up an address translation table in which each address translation information for translating a logical address into a physical address is set to access the disk array, comprising tag generation means for generating logical address tag blocks each containing logical addresses corresponding to all logical blocks in one data stripe written in the disk array, tag write means for writing the logical address tag blocks generated by the tag generation means in specific areas ensured other than data areas on the disk array which store the data stripe, and reconstruction means for sequentially loading a logical address tag stripe containing logical address tag blocks for each stripe from the specific areas of the disk array, and reconstructing the address translation table on the basis of logical addresses set in each of the logical address tag blocks contained in the loaded logical address tag stripe, and a physical address of a data stripe corresponding to the logical addresses.

According to a fourth aspect of the present invention, there is provided a disk array apparatus which has a disk array constituted by a plurality of disk drives, divides data, that is requested by a host computer to be written, into blocks to store the blocks in a buffer, and when data of logical blocks of one stripe is stored in the buffer, writes the data of the logical blocks of one stripe in physically contiguous areas in empty areas of the disk array, comprising tag generation means for generating logical address tag blocks each containing logical addresses corresponding to all physical addresses in one data stripe written in the disk array, and tag write means for writing the logical address tag blocks generated by the tag generation means in specific areas ensured other than data areas on the disk array which store the data stripe.

According to a fifth aspect of the present invention, there is provided a data update method in a disk array apparatus having a disk array which is constituted by a plurality of disk drives and detected by a host computer as one logical disk drive, comprising generating logical address tag blocks each containing logical addresses corresponding to all logical blocks in one data stripe written in the disk array, and writing the generated logical address tag blocks in specific areas ensured other than data areas on the disk array which stores the data stripe.

According to a sixth aspect of the present invention, there is provided a data update method in a disk array apparatus having a disk array which is constituted by a plurality of disk drives and detected by a host computer as one logical disk drive, comprising generating logical address tag blocks each containing logical addresses corresponding to all logical blocks in one data stripe written in the disk array, storing the logical address tag blocks generated by the tag generation means in a buffer, and when logical address tag blocks of one stripe are stored in the buffer, writing these logical address tag blocks in specific areas in the disk array in bulk.

According to a seventh aspect of the present invention, there is provided a data update method in a disk array apparatus having a disk array which is constituted by a plurality of disk drives and detected by a host computer as one logical disk drive, and looking up an address translation table in which each address translation information for translating a logical address into a physical address is set to access the disk array, comprising generating logical address tag blocks each containing logical addresses corresponding to all logical blocks in one data stripe written in the disk array, writing the generated logical address tag blocks in specific areas ensured other than data areas on the disk array which stores the data stripe, and sequentially loading a logical address tag stripe containing logical address tag blocks for each stripe from the specific areas of the disk array, and reconstructing the address translation table on the basis of logical addresses set in each of the logical address tag blocks contained in the loaded logical address tag stripe, and a physical address of a data stripe corresponding to the logical addresses.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the accompanying drawing.

Figure 1:
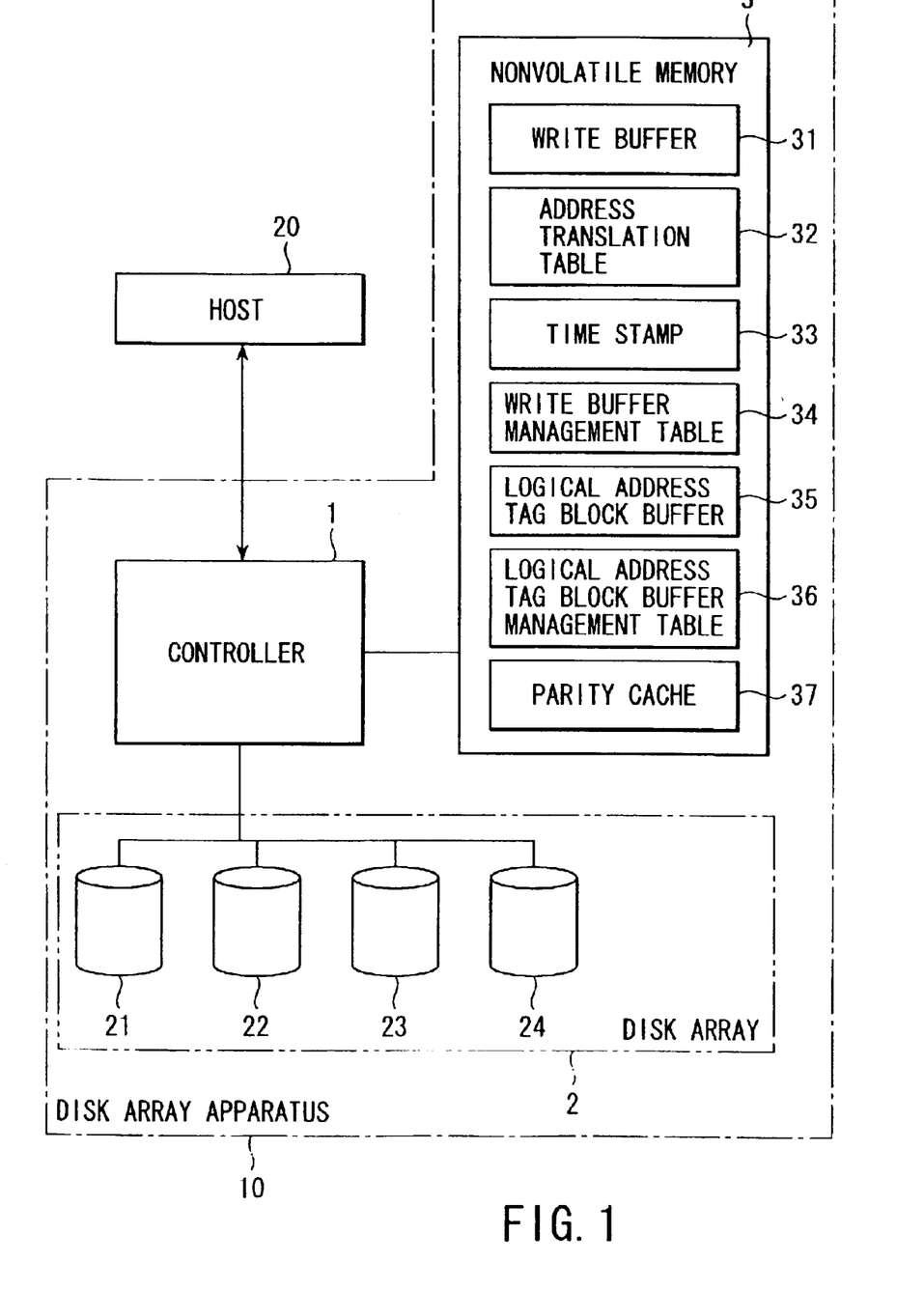
FIG. 1 is a block diagram showing the arrangement of a computer system with a disk array apparatus according to an embodiment of the present invention.

FIG. 1 is a block diagram showing the arrangement of a computer system having a disk array apparatus according to an embodiment of the present invention.

As shown in FIG. 1, a disk array apparatus 10 is comprised of a controller 1, a disk array 2 connected to the controller 1, and a nonvolatile memory 3 connected to the controller 1.

The disk array 2 is constituted by a plurality of disk drives, e.g., four disk drives 21, 22, 23, and 24.

The controller 1 is a disk array controller for controlling the disk array 2, and connected to a host computer (to be referred to as a host hereinafter) 20. The host 20 detects the disk array 2 as one logical disk drive. As an interface between the host 20 and controller 1, for example, SCSI (Small Computer System Interface), PCI bus (Peripheral Component Interconnect Bus), or the like can be applied.

In this embodiment, the arrangement shown in FIG. 1 will be mainly described. However, those skilled in the art recognize, without a detailed description thereof, that the present invention can be practiced even when any other computer system derived from the arrangement shown in FIG. 1 is to be used. For example, the disk array implementation method described in Jpn. Pat. Appln. KOKAI Publication No. 2000-10738, p.25, right column, paragraphs 0042 to 0045 can be applied to implement the controller 1. The disk array implementation method described in this reference is as follows.

1a) A disk array controller is implemented as the part of a host computer. For example, the disk array controller is implemented on the main board of the host computer.

1b) A disk array controller is implemented by adding it to the expansion slot of a computer. For example, the disk array controller is implemented on a PCI card connected to a PCI slot.

1c) A disk array controller is implemented outside a host computer. This method corresponds to a method of implementing the controller 1 shown in FIG. 1, which is applied in this embodiment.

1d) A disk array controller is implemented by software on a host computer.

Before the arrangement in FIG. 1 is described in detail, terms used in the description of this embodiment will be explained.

2a) Logical Block

A logical block is a data block when viewed from the host 20. More specifically, the logical block is a data block on a logical disk area in the disk array 2.

2b) Physical Block

A physical block is a physical block on the disk array 2. More specifically, the physical block is a data block on a physical disk area in the disk array 2, which has a predetermined, constant size.

2c) Logical Address

A logical address is a data address on the disk array 2 when viewed from the host 20. In this case, the logical address is used as a logical block address which represents the position of a data block on a logical disk area in the disk array 2, i.e., the position of a logical block.

2d) Physical Address

A physical address is used to represent the physical position of data (data block) on the disk array 2. The physical address is a physical block address which represents the physical position of a data block on the disk array 2, i.e., the position of a physical block. The physical address has a physical stripe number and physical block number to be described later.

2e) Logical Address Tag

A logical address tag includes a time stamp and logical address corresponding to each logical block.

2f) Parity Block

A parity block is a data block comprised of redundant data corresponding to a plurality of logical blocks.

2g) Logical Address Tag Block

A logical address tag block is a data block comprised of a logical address tag.

2h) Logical Block Number

A logical block number is a data block number of a data block on the disk array 2 when viewed from the host 20.

2i) Physical Block Number

A physical block number is a number representing a relative position of a data block in a physical stripe on the disk array 2. The physical block number is a number unique to each disk drive constituting the disk array 2.

Note that in the following description, a "data block" mainly represents data (actual data except for parity data and logical address tag data) required by the host 20.

Referring to FIG. 1, a write buffer 31, address translation table 32, time stamp 33, write buffer management table 34, logical address tag block buffer 35, logical address tag block buffer management table 36, and parity cache 37 are allocated in the nonvolatile memory 3. A data cache used for temporally holding input/output data between the host 20 and disk array apparatus 10 is omitted.

The write buffer 31 is used for log-structuring and holding data to be written in the disk array 2. The address translation table 32 is a translation map used for translating a logical address (logical block address) into a physical address (physical block address). In this case, the address translation table 32 is used for translating a data address on the disk array 2 when viewed from the host 20, i.e., a logical address into an address indicating a physical data position in the disk array 2, i.e., a physical address.

The time stamp 33 is used for holding a write time order. The write buffer management table 34 is used for holding information of the empty area of the write buffer 31 and the logical address of data held by the write buffer 31.

The logical address tag block buffer 35 is used for log-structuring and holding a logical address tag block to be written in the disk array 2. The logical address tag block buffer management table 36 is used for holding information of the empty area of the logical address tag block buffer 35 and physical stripe information (physical stripe number) corresponding to the logical address tag block held in the logical address tag block buffer 35. The parity cache 37 is used for temporally holding parity data.

The controller 1 controls the disk array 2 in accordance with a control program stored in a storage means such as a ROM (not shown) in advance. The controller 1 also manages the write buffer 31, address translation table 32, time stamp 33, write buffer management table 34, logical address tag block buffer 35, logical address tag block buffer management table 36, and parity cache 37.

Figure 2:
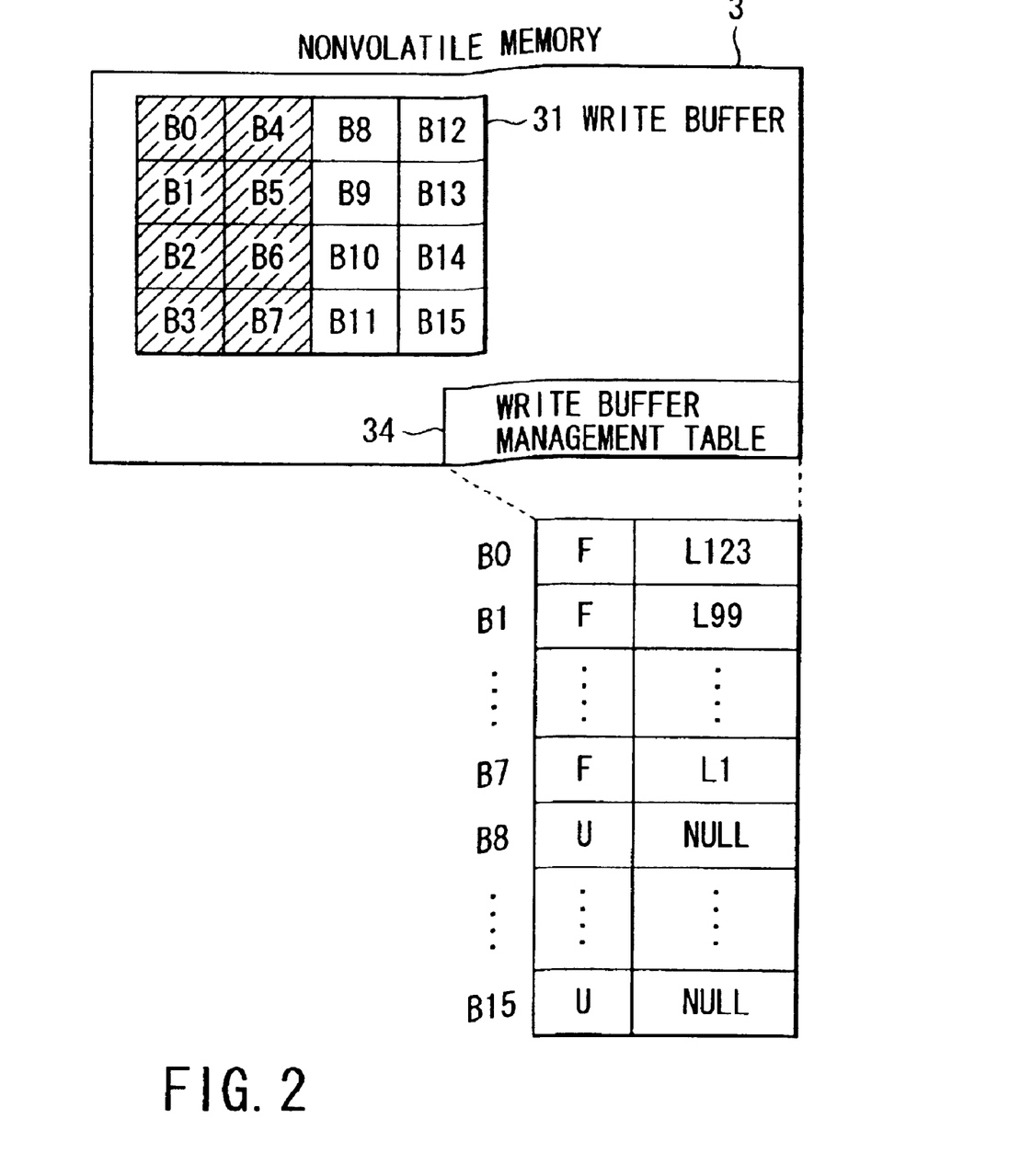
FIG. 2 is a view showing the relationship between a write buffer and write buffer management table on a nonvolatile memory.

FIG. 2 shows the relationship between the write buffer 31 and write buffer management table 34.

The controller 1 does not immediately write data requested from the host 20, and divides the data into blocks and packs them in order. At this time, the controller 1 sets in the logical address tag block buffer 34 logical addresses designating logical blocks which make up write data. More specifically, the controller 1 sets each of the logical addresses in an entry in the write buffer management table 34 that corresponds to an area in the write buffer 31 in which a corresponding logical block is stored.

In this case, the write buffer management table 34 has a field of each flag which represents whether valid data is stored in a block area Bi in the write buffer 31. Reference symbol i denotes an entry number, and in the example shown in FIG. 2, i=0 to 15. In an entry in the write buffer management table 34 which corresponds to an empty block area in the write buffer 31, a flag "U" which represents an empty block area is set. When a logical address is to be set in the entry i of the write buffer management table 34, a flag "F" is set in the flag field of the entry i. The flag "F" represents that data is stored in the block area Bi in the write buffer 31. Thus, by looking up the write buffer management table 34, the controller 1 determines a next block area in which write data received from the host 20 is to be stored.

The example shown in FIG. 2, data is stored in block areas B0 to B7 in the write buffer 31, and logical addresses L123, L99, . . . , L1 of data (logical blocks) are respectively stored in the block areas B0, B1, . . . , B7. Note that the write buffer 31 shown in FIG. 2 represents a case wherein the disk array 2 is used in RAID level (e.g., RAID0, RAID 1, or RAID 10) which requires no parity data generation.

In this case, each of the disk drives 21 to 24 that constitute the disk array 2 writes data in a K (K is an integer larger than 0) multiple of a predetermined block size. At this time, the respective K blocks physically identical in position on the disk drives 21 to 24 are written at the same timings as the respective stripe segments which make up one physical stripe.

The number of data blocks which make up one stripe represents N×K where N represents the number of disk drives constructing the disk array 2; and k, the number of data blocks of one stripe segment. Assuming that N=4 and K=4, one stripe is made up of 16 data blocks (see FIG. 3).

When the disk array 2 is to be used in RAID level (e.g., RAID0, RAID1, or RAID10) which requires no parity data generation, the number of logical blocks contained in one stripe represents N×K. When the disk array 2 is to be used in RAID level (e.g., RAID4, RAID5, or RAID50) which requires parity data generation, the number of logical blocks represents (N−1)×K. A stripe segment size (the number of blocks) is preferably approximate to the size of the one track length of the disk array apparatus.

The number of block regions of the write buffer 31 must equal the number of logical blocks contained in one stripe. Therefore, in a case wherein the disk array 2 is constituted by the four disk drives 21 to 24 and used in RAID level which requires no parity data generation, the number of block areas of the write buffer 31 is set in N×K=4×4=16. That is, this equals the number of data blocks in one stripe. Obviously, the write buffer 31 shown in FIG. 2 represents this case.

In contrast, when the disk array 2 is used in RAID level which requires parity data generation, the number of block areas of the write buffer 31 is decreased by the number of blocks for parity data. That is, the number of block areas is set in (N−1)×K=(4−1)×4=12. In this case, for the sake of descriptive convenience, it is assumed that the disk array 2 employs the redundant configuration of RAID4, and a specific one of the disk drives 21 to 24, e.g., the disk drive 24 is assigned as a parity disk drive for storing parity data.

In this embodiment, the disk array 2 has an apparent storage capacity for the host 20 that is smaller than the actual capacity (the total storage capacity obtained by totalizing the storage capacities of the disk drives 21 to 24). For this reason, when the host 20 inquires of the controller 1 about the storage capacity of the disk array 2 first, the controller 1 returns the apparent storage capacity as a response. This ensures in the disk array 2 an extra storage area other then the storage area in/from which the host 20 can logically write/read. This area is called as an empty area. In this embodiment, even when all the storage areas in/from which the host 20 can logically write/read are used, an empty area is surely ensured on the disk array 2. The physical position of this empty area is not fixed. When the logical storage area used by the host 20 is small, the empty area has a storage capacity larger than the extra storage area.

When the host 20 actually writes write data in the disk array 2 for each stripe, the time stamp 33 on the nonvolatile memory 3 is added to the write data. The time stamp 33 is used for determining a data write order in the disk array 2. Accordingly, the value of the time stamp 33 is incremented by, e.g., one every time data of the write buffer 31 is written in the disk array 2. Whether the data of a stripe is new or old is determined by viewing the time stamp 33 on the stripe.

The operation of the disk array apparatus 10 shown in FIG. 1 will be described next.

The write operation of the disk array apparatus 10 will be described first.

Assume that the controller 1 in the disk array apparatus 10 receives data to be written and the logical address and data size of the data in response to write (update) request from the host 20.

The controller 1 divides the received write data into blocks and packs them in empty areas in the write buffer 31 on the nonvolatile memory 3. The controller 1 obtains a logical address (logical block address) in each block on the basis of the received logical address and data size, and stores it in a corresponding entry in the write buffer management table 34.

Note that when data for updating data which has been stored in the write buffer 31 is to be written, this data is not packed in the empty area of the write buffer 31, but the old data in the write buffer 31 is updated. Whether updating data is written for data which has been stored in the write buffer 31 can be determined by checking whether a logical block address corresponding that data is set and an entry that has the flag "F" is present in the write buffer management table 34.

When data with the logical blocks of one stripe is stored in the write buffer 31, the controller 1 writes the logical blocks of one stripe in the physically contiguous areas of empty areas on the disk drives 21 to 24 which are different from areas in which data to be updated is stored. More specifically, in a case wherein no parity data is generated, data of one stripe constructed by the logical blocks, i.e., N×K=4×4=16 logical blocks are written in the disk drives 21 to 24.

Figure 3:
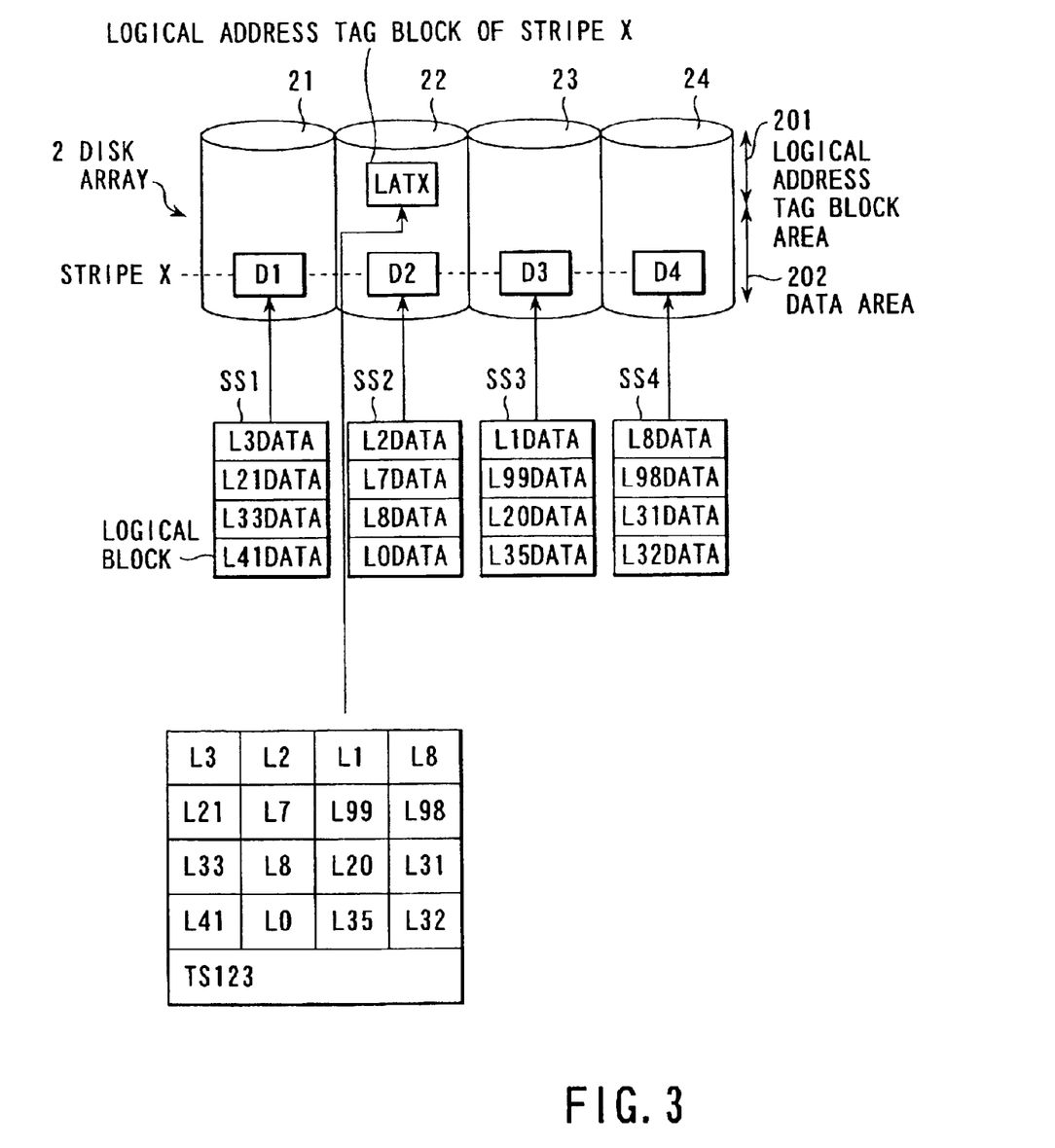
FIG. 3 is a view showing the relationship between logical blocks and a logical address tag block of one stripe, which are written in a disk array.

FIG. 3 shows this state.

The example shown in FIG. 3 represents that four stripe segments SS1, SS2, SS3, and SS4 are respectively written in the empty areas of the disk drives 21 to 24 as data D1, D2, D3, and D4 which make up one physical stripe X in bulk.

In the following description, a physical stripe containing such data may be called a "data stripe". In contrast, a physical stripe containing logical address tag blocks may be called a "logical address tag stripe".

The stripe segment SS1 is made up of logical blocks (L3Data, L21Data, L33Data, and L41Data) with logical addresses L3, L21, L33, and L41. The stripe segment SS2 is made up of logical blocks (L2Data, L7Data, L8Data, and L0Data) with logical addresses L2, L7, L8, and L0. The stripe segment SS3 is made up of logical blocks (L1Data, L99Data, L20Data, and L35Data) with logical addresses L1, L99, L20, and L35. The stripe segment SS4 is made up of logical blocks (L8Data, L98Data, L31Data, and L32Data) with logical addresses L8, L98, L31, and L32. These data D1 to D4 are respectively written in data areas 202 (to be described later) formed in the respective disk drives 21 to 24.

In a case wherein parity data is to be generated, the controller 1 generates parity data of one stripe made up of K=4 parity blocks from the (N−1)×K=3×4=12 logical blocks that equals in number to "one stripe—one stripe segment" data blocks. The controller 1 writes N×K (=16) data blocks, obtained by adding the K parity blocks to the (N−1)×K logical blocks, in the physically contiguous areas of empty areas on the disk drives 21 to 24 which are different from areas in which data to be updated is stored.

Figure 4:
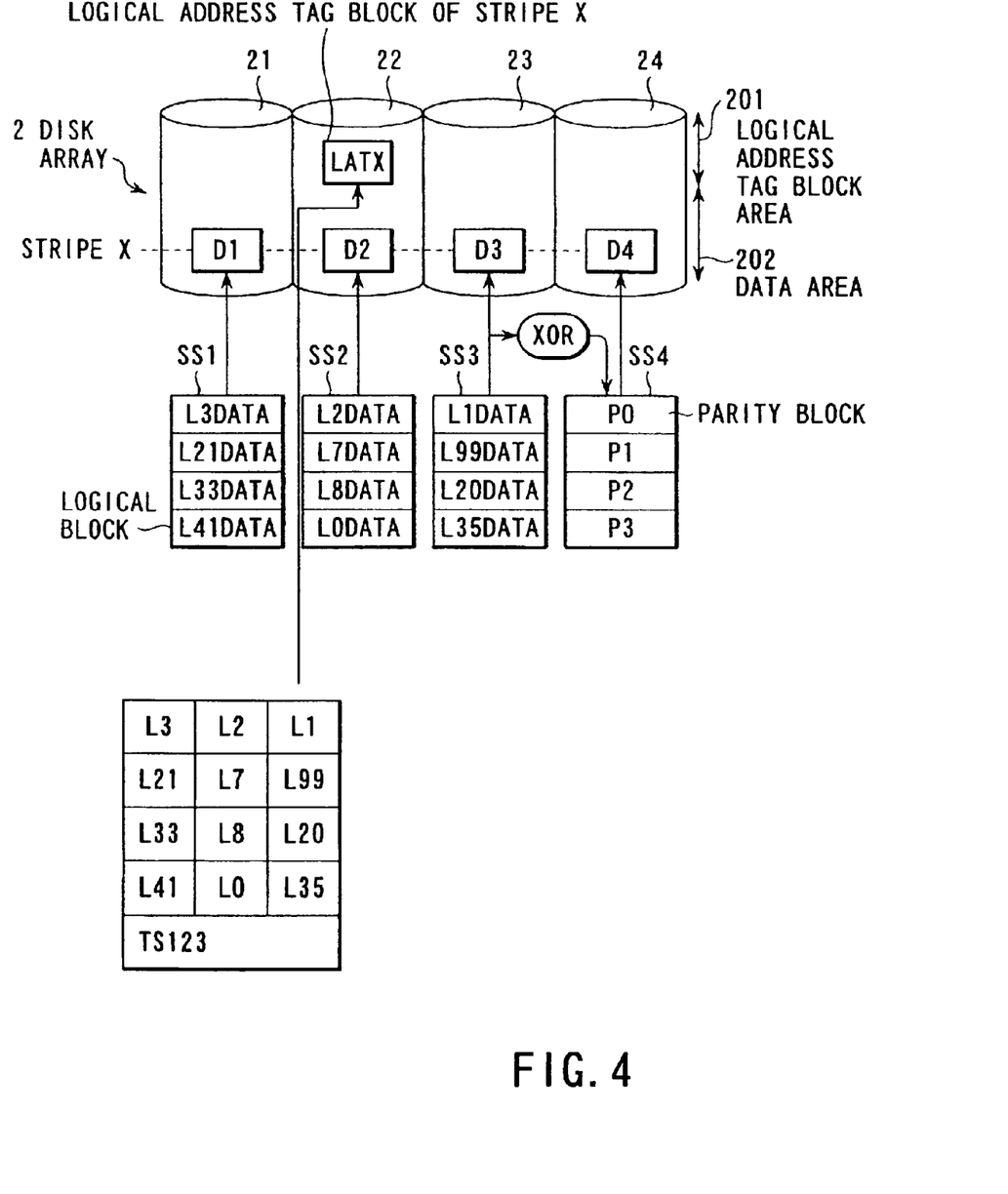
FIG. 4 is a view showing the relationship among logical blocks, parity blocks, and a logical address tag block of one stripe, which are written in the disk array.

FIG. 4 shows this state.

The example shown in FIG. 4 represents that 4 stripe segments SS1, SS2, SS3, and SS4 are respectively written in the empty areas of the disk drives 21 to 24 as data D1, D2, D3, and P which make up one physical stripe X in bulk.

The stripe segment SS1 is made up of logical blocks (L3Data, L21Data, L33Data, and L41Data) with logical addresses L3, L21, L33, and L41. The stripe segment SS2 is made up of logical blocks (L2Data, L7Data, L8Data, and L0Data) with logical addresses L2, L7, L8, and L0. The stripe segment SS3 is made up of logical blocks (L1Data, L99Data, L20Data, and L35Data) with logical addresses L1, L99, L20, and L35. The stripe segment SS4 is made up of parity blocks P0, P1, P2, and P3. These data D1 to D4 are respectively written in data areas 202 (to be described later) formed in the respective disk drives 21 to 24.

The parity block P0 is generated by exclusive OR (XOR) of the logical blocks with the logical addresses L3, L2, and L1. The parity block P1 is generated by exclusive OR of the logical blocks with the logical addresses L21, L7, and L99. The parity block P2 is generated by exclusive OR of the logical blocks with the logical addresses L33, L8, and L20.

The parity block P3 is generated by exclusive OR of the logical blocks with the logical addresses L41, L0, and L35.

At this time, the controller 1 generates a logical address tag block containing the time stamp and the logical addresses of logical blocks of one stripe stored in the write buffer 31. The relative setting positions of the logical addresses in the logical address tag block and the relative storage positions of logical blocks, in the data stripe, which are designated by the logical addresses are decided to have one-to-one correspondence in advance. A logical address tag block indicates a logical address of each logical block in a data stripe corresponding to the logical address tag block.

In this embodiment, as shown in FIGS. 3 and 4, areas of the disk array 2, a logical address tag block area 201 and the data area 202 are independently managed.

The logical address tag block written in an empty area in the data area 202 is written in a block position in the logical address tag block area 201 which is decided by the physical stripe number of a physical stripe (data stripe) x. That is, the block position in the logical address tag block area 201 at which the logical address tag block is to be written and the physical stripe x (physical stripe number) corresponding to this logical address tag block have one-to-one correspondence in advance.

In this embodiment, the logical address tag block is not immediately written in the logical address tag block area 201 on any one of the disk drives 21 to 24. When generating a logical address tag block, the controller 1 temporally stores this tag block in the logical address tag block buffer 35. When the logical address tag blocks of one stripe are stored in the logical address tag block buffer 35, the controller 1 writes these logical address tag blocks on the disk drives 21 to 24 in bulk.

In this manner, since this embodiment unifies a large number of disk writes of data such as logical blocks and logical address tag blocks, disk write performance is much improved.

Write processing for the logical address tag block will be described in detail next.

First, upon writing the logical blocks of one stripe in the disk array 2 in bulk, the controller 1 generates data of a logical address tag block corresponding to the logical blocks of one stripe. The controller 1 temporally stores the generated data in the empty block area of the logical address tag block buffer 35 on the nonvolatile memory 3.

At this time, the controller 1 properly moves any logical blocks on the logical address tag block buffer 35 such that logical address tag blocks stored in the logical address tag block buffer 35 are in ascending order of the physical stripe numbers each of which represents the physical position of a data stripe in the disk array 2.

In addition, the controller 1 stores a data stripe number corresponding to a logical address tag block stored in the logical address tag block buffer 35, in an entry i in the logical address tag block buffer management table 36 corresponding to the block position of the logical address tag block in the logical address tag block buffer 35. When the physical stripe is stored in the entry i in the logical address tag block buffer 36, the controller 1 sets a flag "F" in the flag field in the entry i.

Figure 5:
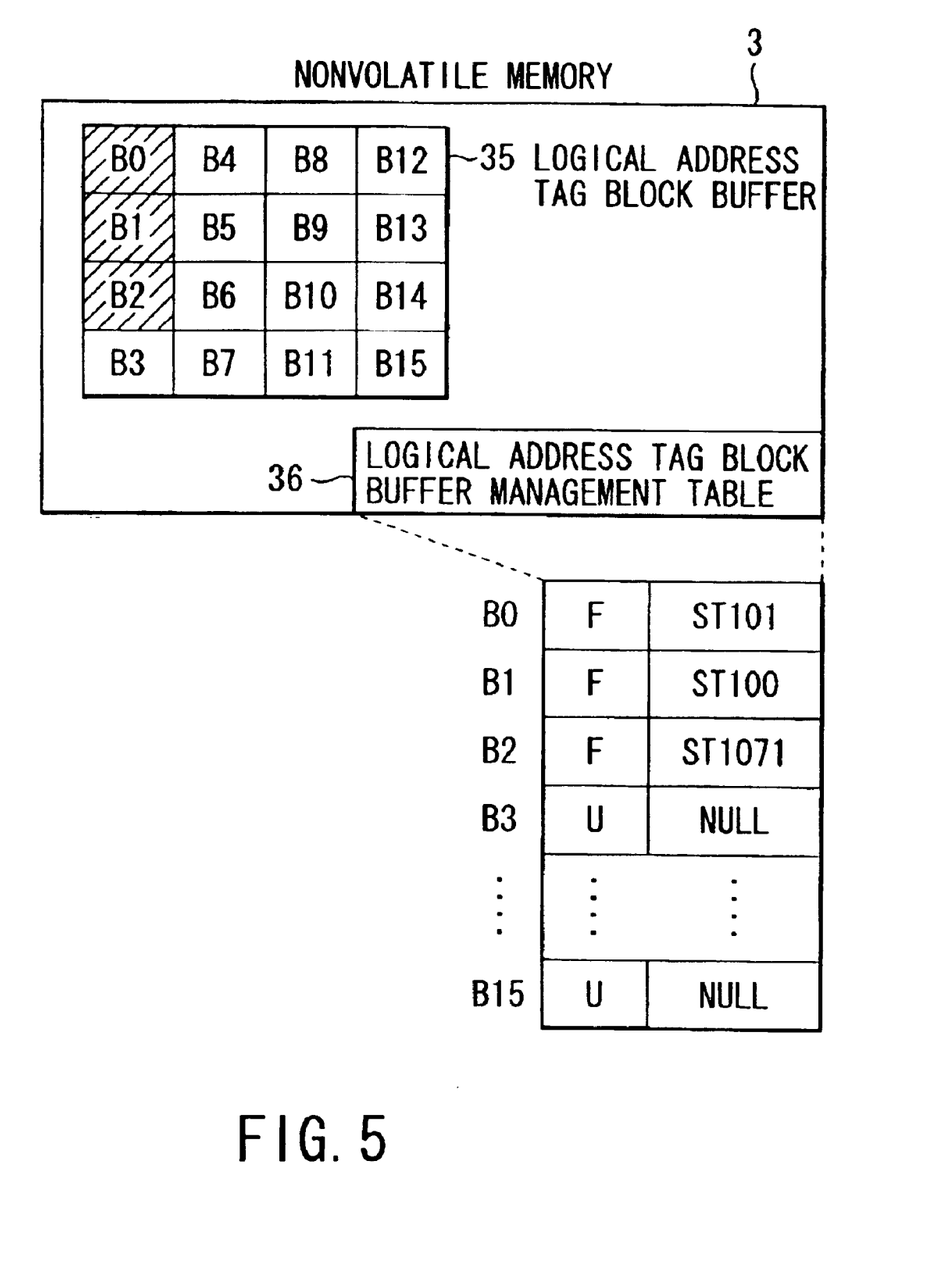
FIG. 5 is a view showing the relationship between a tag block buffer and tag block buffer management table on the nonvolatile memory.

FIG. 5 shows the relationship between the logical address tag block buffer 35 and logical address tag block buffer management table 36. In the example shown in FIG. 5, write data is stored in block areas B0 to B2 in the logical address tag block buffer 35, and the logical address tag blocks stored in the block areas B0, B1, and B2 respectively correspond to physical stripes (data stripes) having physical stripe numbers ST101, ST100, and ST1071. In the example shown in FIG. 5, the logical address tag blocks in the block areas B0 and B1 are exchanged to each other in an order of the physical stripe numbers ST100 and ST101.

When the logical address tag blocks of one stripe are stored in the logical address tag block buffer 35, the controller 1 writes the logical address tag blocks of one stripe in the disk drives 21 to 24 in bulk. More specifically, the controller 1 writes data at positions corresponding to the respective logical address tag block areas 201 in the disk array 2 in bulk.

Note that even if all the logical address tag blocks of one stripe are not stored, when a predetermined time T has elapsed from a time at which the latest logical address tag block of the blocks of one stripe is written, in consideration of the use efficiency of the logical address tag block buffer 35, the logical address tag blocks stored in the logical address tag block buffer 35 are removed at this time and written in the disk array 2. The predetermined time T depends on, e.g., the load state of the disk array apparatus 10.

Even if the logical address tag blocks are stored in all the block areas of the logical address tag block buffer 35, when the stored logical address tag blocks contain logical address tag blocks which are physically discontinuous on the disk array 2, the write process of the logical address tag block described above is performed for the logical address tag blocks corresponding to the discontinuous physical stripes.

In the case wherein the disk array 2 requires parity data, parity data before update (old parity data) is required for updating parity data set in a logical address tag stripe in which logical address tag blocks before update are contained. It is inefficient that parity data (parity block) is read out from the disk array 2 every time a logical address tag block is written in the disk array 2.

To solve this, in this embodiment, when data blocks of one logical address tag stripe containing parity data made up of K parity blocks are to be written in the disk array 2, the parity data are cached in the parity cache 37. Target parity data is to be read out from the parity cache 37. A method of caching parity data is descried in detail in, e.g., Daniel Stodolsky, Garth Gibson, and Mark Holland, "Parity Logging Overcoming the Small Write Problem in Redundant Disk Arrays", the 20th Annual International Symposium on Computer Architecture, May 16–19, 1993, San Diego Calif., and a detailed description thereof is omitted.

Figure 6:
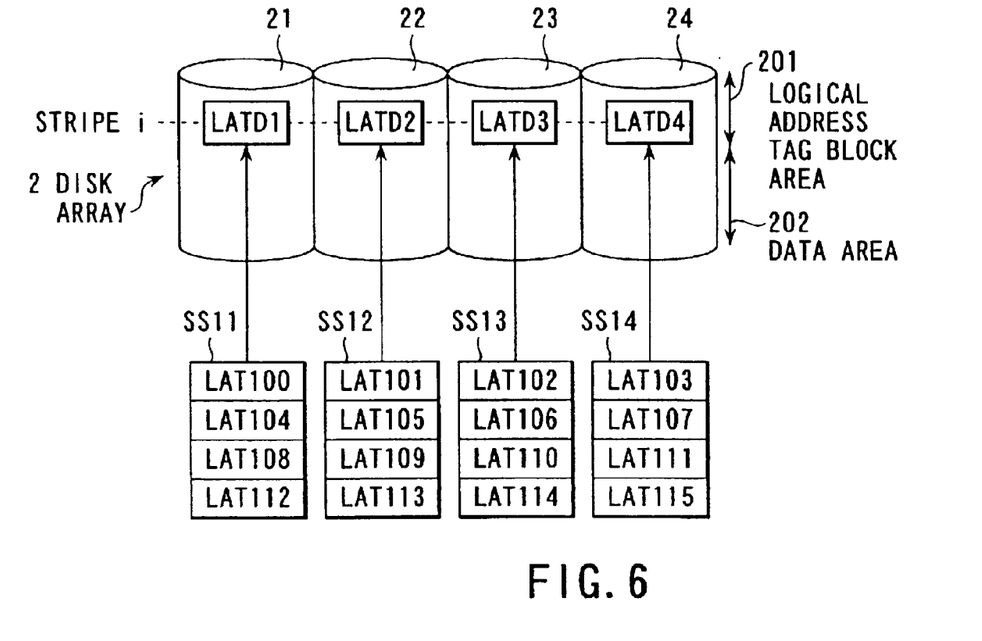
FIG. 6 is a view showing a state when data blocks of one stripe made up of logical address tag blocks are stored in the disk array.
Figure 7:
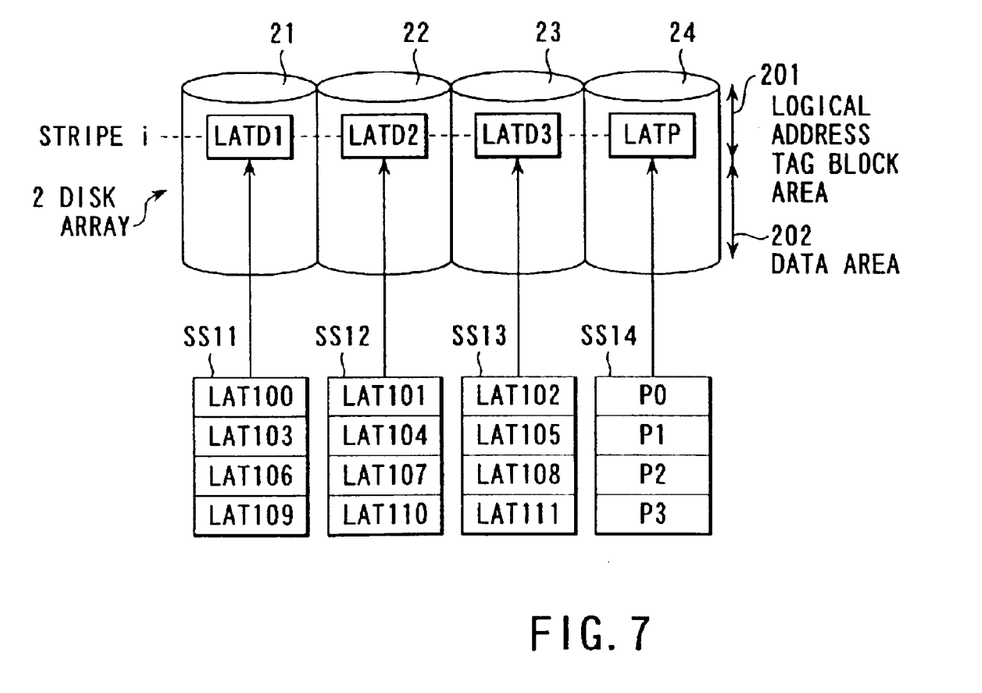
FIG. 7 is a view showing a state when data blocks of one stripe made up of logical address tag blocks and parity blocks are stored in the disk array.

FIGS. 6 and 7 respectively show the states when data blocks of one stripe containing logical address tag blocks of one stripe are stored in the disk array 2. FIG. 6 shows the case wherein the disk array 2 requires no parity data. FIG. 7 shows the case wherein the disk array 2 requires parity data. Reference symbols LAT100, LAT 101, . . . in FIGS. 6 and 7 denote logical address tag blocks. The expression of LATxyz represents that a logical address tag block with LATxyz corresponds a physical stripe xyz. For example, a logical address tag block with LAT100 corresponds to a physical stripe 100.

The example shown in FIG. 6 represents that four stripe segments SS11, SS12, SS13, and SS14 are respectively written, as logical address tag block data LATD1, LATD2, LATD3, and LATD4, in corresponding areas which belong to a logical address tag stripe i in the logical address tag block areas 201 on the disk drives 21 to 24. The position of the stripe i in the logical address tag block areas 201 depends on the physical stripes 100 to 115 in the data areas 202.

Referring to FIG. 6, the stripe segment SS11 is made up of four logical address tag blocks LAT100, LAT104, LAT108, and LAT112 respectively corresponding to physical stripes 100, 104, 108, and 112. The stripe segment SS12 is made up of four logical address tag blocks LAT101, LAT105, LAT109, and LAT113 respectively corresponding to physical stripes 101, 105, 109, and 113. The stripe segment SS13 is made up four logical address tag blocks LAT102, LAT106, LAT110, and LAT114 respectively corresponding to physical stripes 102, 106, 110, and 114. The stripe segment SS14 is made up of four logical address tag blocks LAT103, LAT107, LAT111, and LAT115 respectively corresponding to physical stripes 103, 107, 111, and 115.

The example shown in FIG. 7 represents that four stripe segments SS11, SS12, SS13, and SS14 are respectively written, as logical address tag block data LATD1, LATD2, LATD3, and LATP, in corresponding areas which belong to a logical address tag stripe i in the logical address tag block areas 201 on the disk drives 21 to 24. The position of the stripe i in the logical address tag block areas 201 depends on the physical stripes 100 to 111 in the data areas 202.

Referring to FIG. 7, the stripe segment SS11 is made up of four logical address tag blocks LAT100, LAT103, LAT106, and LAT109 respectively corresponding to physical stripes 100, 103, 106, and 109. The stripe segment SS12 is made up of four logical address tag blocks LAT101, LAT104, LAT107, and LAT110 respectively corresponding to physical stripes 101, 104, 107, and 110. The stripe segment SS13 is made up four logical address tag blocks LAT102, LAT105, LAT108, and LAT111 respectively corresponding to physical stripes 102, 105, 108, and 111. The stripe segment SS14 is made up of parity blocks P0, P1, P2, and P3.

Figure 8:
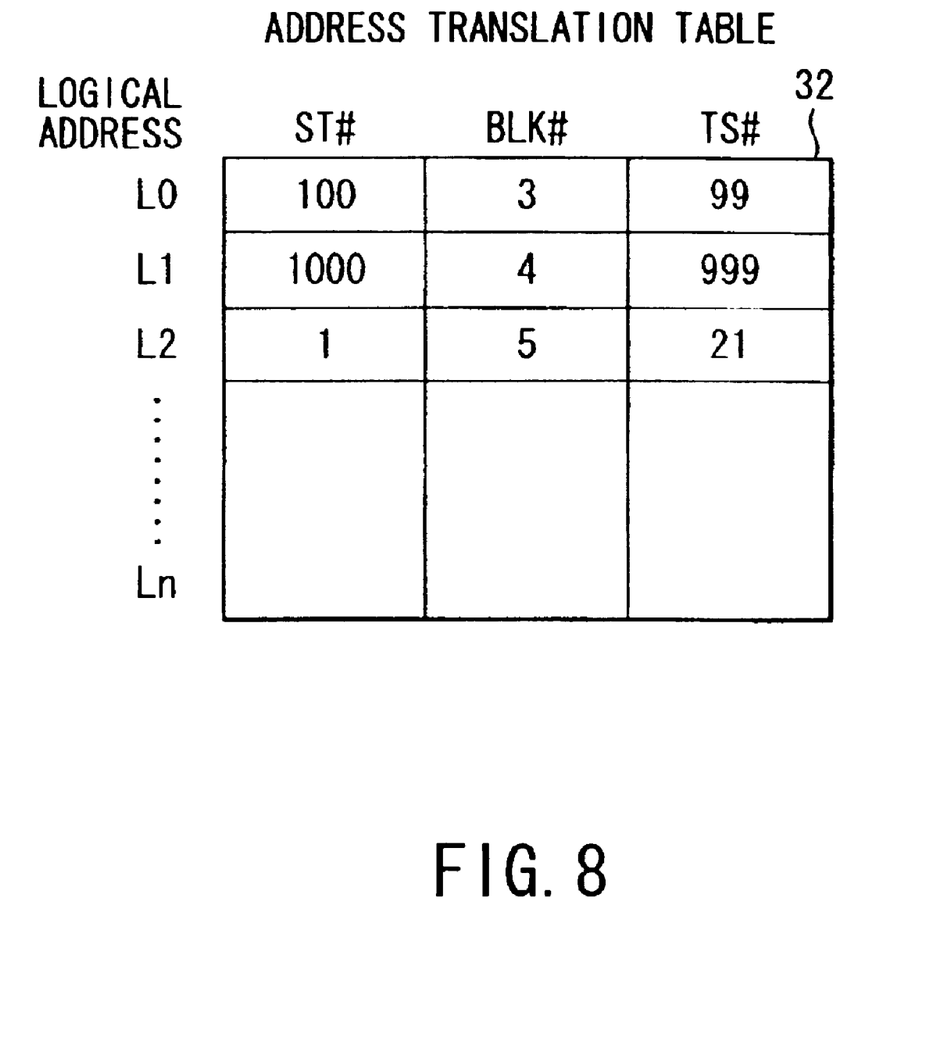
FIG. 8 is a view showing the data structure of an address translation table.

The address translation table 32 allocated on the nonvolatile memory 3 will be described herein with reference to FIG. 8.

Each entry of the address translation table 32 corresponds to a unique logical address. In the example shown in FIG. 8, in consideration of an efficiency when the address translation table 32 is looked up, the ith entry of the address translation table 32 corresponds to the logical address Li. The number of entries of the address translation table 32 coincides with the number of all logical addresses that are viewed from the host 20 (n+1 in FIG. 8).

Address translation information made up of a physical stripe number ST#, physical block number BLK#, and time stamp TS# is set in each entry i (i=0 to n) of the address translation table 32. The physical stripe number ST# represents a physical stripe containing a physical block on the disk array 2, to which a logical block represented by a corresponding logical address Li is allocated. The physical block number BLK# represents a relative position of the Physical block contained in the physical stripe. The time stamp TS# manages the time order in which a data block with a corresponding logical address Li is written in the disk array 2.

In the address translation table 32 having this data structure, if the logical address Li is given, the actual physical address is easily obtained from the corresponding physical stripe number ST# and physical block number BLK# by looking up the entry in the address translation table 32 which corresponds to the logical address Li. For example, a data read process for the disk array 2 which is performed in response to a read request from the host 20 is performed by translating a logical address designated by the request into a physical address on the disk array 2 in accordance with the address translation table 32.

When, e.g., a failure occurs on the nonvolatile memory 3, the disk array apparatus 10 in which the address translation table 32 is allocated on the nonvolatile memory 3 must reconstruct the address translation table 32 after changing the nonvolatile memory 3 and controller 1.

To easily understand the functional effect of the present invention, the address translation table reconstruction process in the conventional disk array apparatus will be conveniently described with reference to FIG. 1 first.

In the conventional disk array apparatus, a logical address tag is contained in a data stripe on the disk array 2. The logical address tag is loaded from the data stripe first, and the time stamp in the same logical address registered in the address translation table 32 is checked for each of all the logical addresses set in the loaded logical address tag. Only when the time stamp of the logical address in the data stripe is newer (a time stamp value is larger) than that in the address translation table 32, the physical stripe number of the data stripe and the physical block number unique to the position of that logical address in the logical address tag are set in an entry in the address translation table 32. This process is executed for each of all the data stripes in the disk array 2, thus reconstructing the address translation table 32 which designates only valid blocks.

In addition, every time data of one stripe is written in the disk array 2, the process is executed for the logical address tags in the stripe, thereby maintaining the state of the address translation table 32 such that it always designates valid blocks.

In this manner, a main process in the address translation table reconstruction is a check process for the logical address tag. Consequently, in a disk array apparatus with the number of logical address tags such as a large-capacity disk array apparatus, the conventional method of reconstructing address translation table requires a long period of time.

In contrast, in the embodiment of the present invention, the logical address tag blocks are separated from the data stripe holding data, and allocated for each stripe in the logical address tag dedicated areas 201 which are ensured on the disk array 2. This allows reading out logical address tag blocks for each stripe from the disk array 2 in bulk, and the reconstruction process of the address translation table 32 requiring the logical address tag blocks can be executed in a short period of time. In other words, in this embodiment, since load processing for the logical address tag blocks are parallelly executed for the disk drives 21 to 24, the time required for reconstructing the address translation table 32 can be very short.

Unlike the prior art, since no logical address blocks are contained in the data stripe, when the host 20 requests the plurality of physically continuous data blocks, only the series of required data blocks can be loaded. This can shorten the execution time of defragmentation in which the valid logical blocks in the plurality of stripes are reallocated in an order of logical addresses in stripes smaller in number than the former stripes. In addition, the defragmentation effect can be improved.

Note that if efficiency in a case wherein the logical address tag blocks are written in the logical address tag block areas 201 is not considered, logical address tag blocks need not be written for each stripe in bulk, and may be written one by one.

The processing operation of the disk array apparatus 10 in this embodiment, i.e., the write process of the logical address tag block and the reconstruction process of the address translation table 32 will be described in detail below.

[Logical Address Tag Block Write Process]

Figure 9:
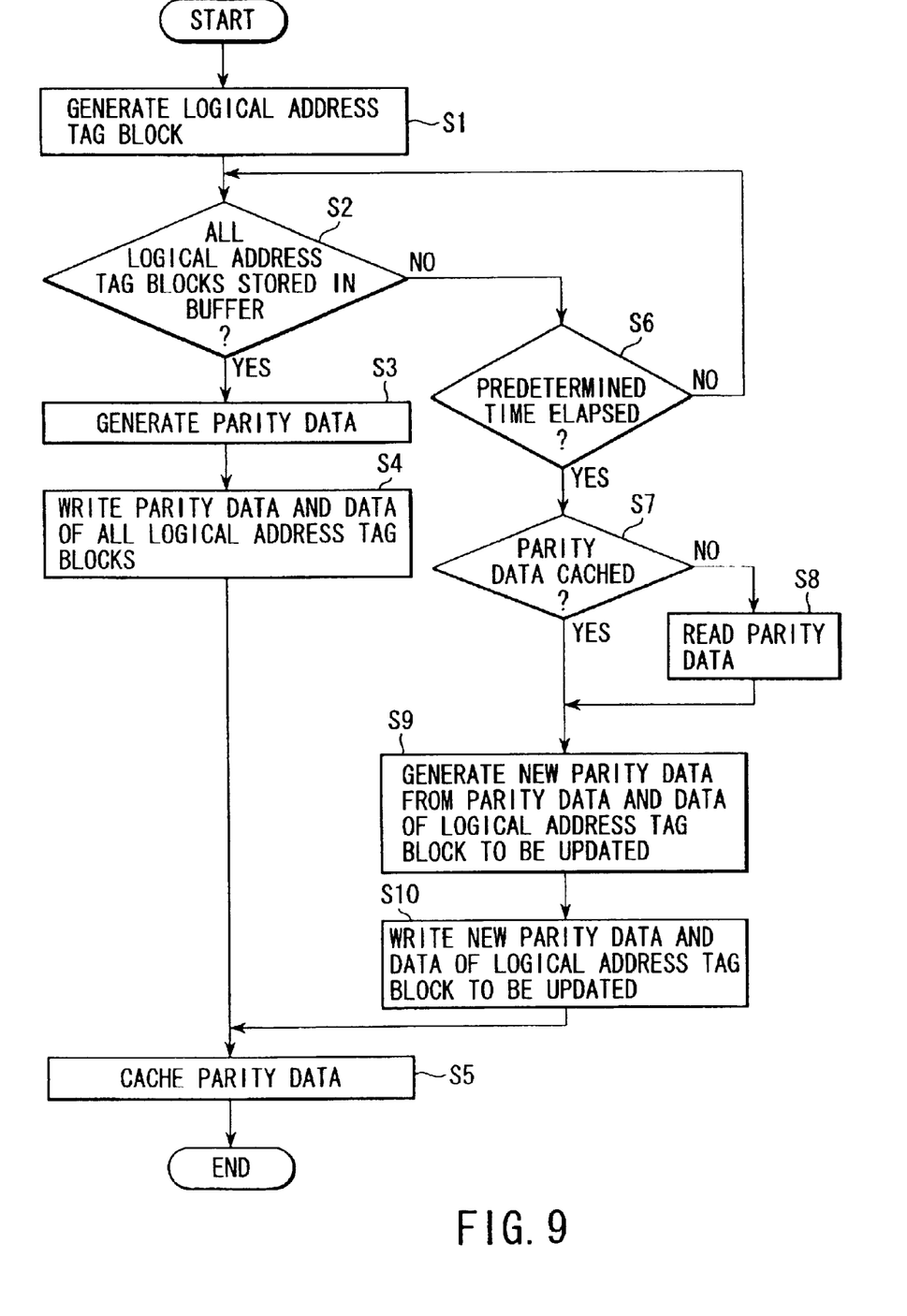
FIG. 9 is a flow chart showing processing in the disk array apparatus when a logical address tag block is written.

FIG. 9 is a flow chart showing logical address tag block write processing in the disk array apparatus 10. This flow chart is described assuming that the disk array 2 is used in RAID level (e.g., RAID4, RAID5, or RAID50) which requires parity data.

As described above, the controller 1 generates a logical address tag block containing logical addresses corresponding to all the logical blocks in one data stripe, and stores it in the logical address tag block buffer 35 (step S1).

At this time, the controller 1 checks whether the logical address tag blocks of one stripe are fully stored in the logical address tag block buffer 35 (step S2). If the logical address tag blocks of one stripe are fully stored in the logical address tag block buffer 35 (YES in step S2), the controller 1 generates parity data corresponding to the logical address tag blocks of one stripe (step S3). After parity data generation, the controller 1 writes the generated parity data and data of the logical address tag blocks of one stripe in the logical address tag block areas 201 on the disk array 2 in bulk (step S4). More specifically, data of one stripe is written at positions of the logical address tag block areas 201 on the disk array 2, which are determined by the corresponding data stripes in the data areas 202.

Subsequently, the controller 1 stores in the parity cache 37 a copy of the parity data in data of one stripe written in the logical address tag block areas 201 on the disk array 2 (step S5). That is, the parity data corresponding to the logical address tag blocks of one stripe is cached in the parity cache 37. In the example shown in FIG. 7, the parity data LATP made up of the parity blocks P0 to P3 is cached in the parity cache 37.

If the logical address tag blocks of one stripe are not fully stored in the logical address tag block buffer 35, when the predetermined time T has elapsed from time at which the latest logical address tag block of one stripe is written in the logical address tag block buffer 35 (step S2→YES in step S6), the controller 1 executes the following process so as to remove the logical address tag blocks to be updated which are held in the logical address tag block buffer 35.

That is, first, the controller 1 checks whether parity blocks corresponding to the logical address tag blocks to be updated which are held in the logical address tag block buffer 35 are cached in the parity cache 37 (step S7). If no target parity blocks are cached (No in step S7), the controller 1 loads data of the target parity blocks from the logical address tag block areas 201 of the disk array 2 (step S8), and the flow advances to step S9. If the target parity blocks are cached (YES in step S7), the controller 1 advances to step S9.

In step S9, the controller 1 generates new data of the parity blocks (new parity data) on the basis of data of the logical address tag blocks to be updated in the logical address tag block buffer 35 and data of the parity blocks loaded from the disk array 2 or parity cache 37. More specifically, data of logical address tag blocks and data of the parity blocks are XORed to generate new parity data.

Subsequently, the controller 1 updates data by writing in the logical address tag block areas 201 on the disk array 2 the data of the logical address tag blocks to be updated and the new parity data generated in step S9 (step S10). The controller 1 then caches the new parity block data in the parity cache 37 (step S5).

[Address Translation Table Reconstruction Process]

Figure 10:
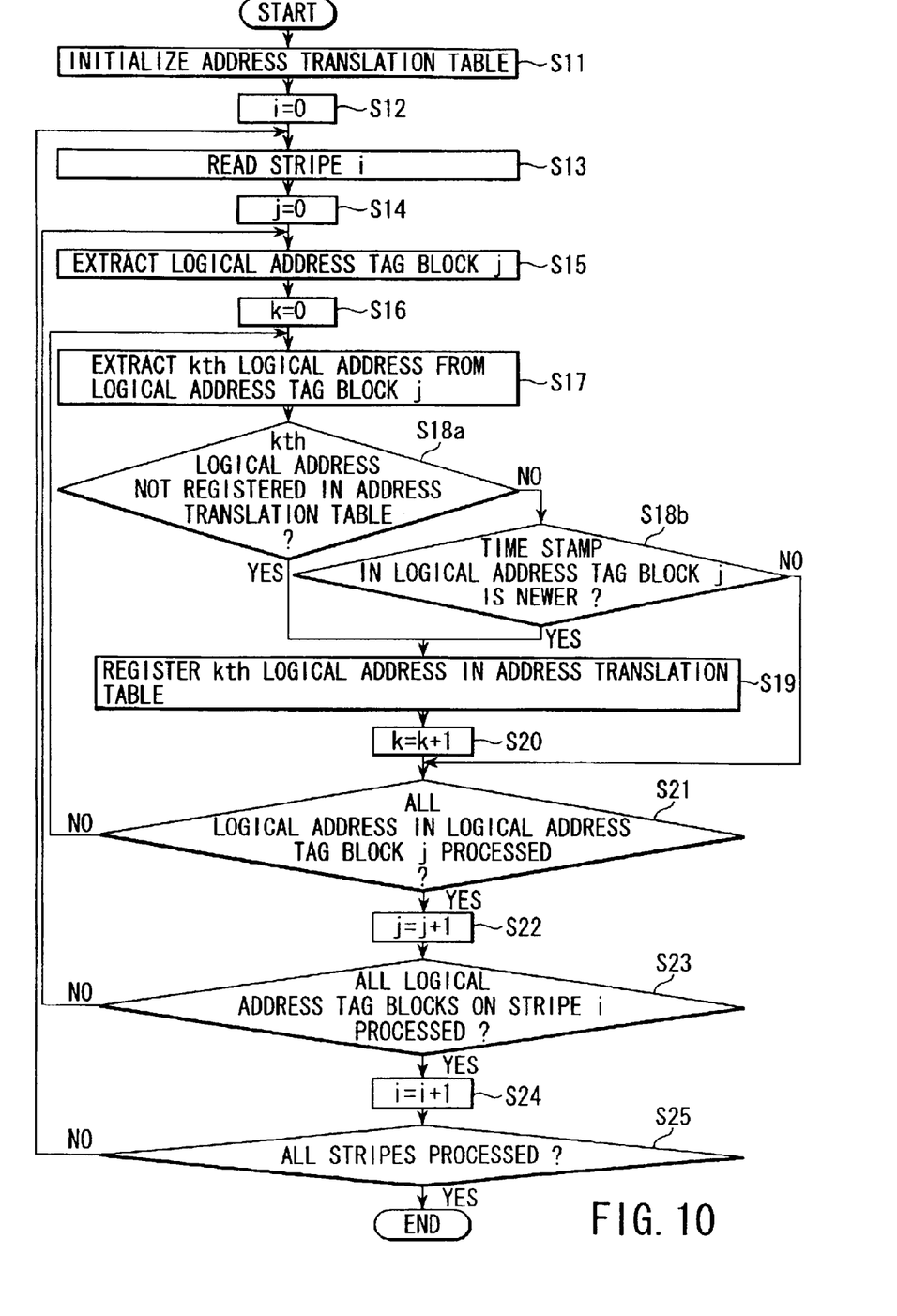
FIG. 10 is a flow chart showing address translation table reconstruction processing of the disk array apparatus.

FIG. 10 is a flow chart showing reconstruction processing of the address translation table 32 of the disk array apparatus 10. This reconstruction processing of the address translation table 32 is executed when, e.g., a failure has occurred in the nonvolatile memory 3.

First, the controller 1 initializes the address translation table 32 on the nonvolatile memory 3 (step S11). This address translation table 32 is initialized by setting "NULL"s in the physical stripe number ST# field, physical block number BLK# field, and time stamp TS# field of each of all the entries in the address translation table 32.

Subsequently, the controller 1 sets an initial value 0 to a variable i which designates the number of a logical address tag stripe stored in the logical address tag block areas 201 of the disk array 2 (step S12). The controller 1 then loads the stripe i from the logical address tag block areas 201 of the disk array 2 for each stripe (step S13). This stripe i contains a number of logical address tag blocks. For example, as shown in FIG. 6, a certain stripe i contains 4×4=16 logical address tag blocks.

At this time, the controller 1 sets an initial value 0 to a variable j which designates the position (block number) of each logical address tag block in the stripe i (step S14). The controller 1 extracts a logical address tag block j from the stripe i (step S15).

The controller 1 then sets an initial value 0 to a variable k which designates the position of each logical address in the logical address tag block j (step S16). The controller 1 extracts a kth logical address from the logical address tag block j (step S17).

At this time, the controller 1 checks whether address translation information corresponding to the kth logical address is not registered in the address translation table 32 (step S18a). If address translation information corresponding to the kth logical address is not registered in the address translation table 32 (YES in step S18a), the controller 1 registers the kth logical address and the address translation information containing a physical address on the data stripe corresponding to the kth logical address (step S19).

If address translation information corresponding to the kth logical address is registered in the address translation table 32 (NO in step S18a), the controller 1 performs the following process.

That is, the controller 1 compares the time stamp contained in the logical address tag block j loaded from the disk array 2 with the time stamp corresponding to the kth logical address registered in the address translation table 32 to check which time stamp is newer (which time stamp is larger) (step S18b). Consequently, if the time stamp containing in the logical address tag block j is newer (YES in step S18b), the controller 1 determines that the data must be updated, and registers the kth logical address and the address translation information containing a physical address on the data stripe corresponding to the kth logical address (step S19).

Subsequently, the controller 1 increments the variable k by one (step S20). The controller 1 then checks from the incremented variable k whether all the logical addresses on the logical address tag block j have been processed (step S21). If any unprocessed logical address remains (NO in step S21), the controller 1 executes step S17 and subsequent steps for a logical address, on the logical address tag block j, designated by the variable k incremented in step S20.

If all the logical addresses have been processed (YES in step S21), the controller 1 increments the variable j by one (step S22). The controller 1 then checks from the incremented variable j whether all the logical address tag blocks on the stripe i have been processed (step S23). If any unprocessed logical address tag block remains (NO in step S23), the controller 1 executes step S15 and subsequent steps for the logical address tag block designated by the variable j incremented in step S22.

If all the logical address tag blocks have been processed (YES in step S23), the controller 1 increments the variable i by one (step S24). The controller 1 then checks from the incremented variable i whether all the stripe on the logical address tag block areas 201 have been processed (step S25). If any unprocessed stripe remains (NO in step S25), the controller 1 executes step S13 and subsequent steps for the stripe designated by the variable i incremented in step S24. If all the stripes on the logical address tag block areas 201 have been processed (YES in step S25), the controller 1 terminates the reconstruction processing of the address translation table 32.

In this manner, the logical address tag blocks written in the logical address tag block areas 201 of the disk array 2 are sequentially loaded for each stripe, and the address translation table 32 is reconstructed on the basis of the logical addresses set for the logical address tag blocks, and the physical addresses corresponding to these logical addresses.

As described above, in this embodiment, the logical address tag block is separated from the data stripe holding data, and is stored in the area dedicated for the logical address tag block. With this arrangement, the logical address tag blocks of each stripe can be loaded in bulk, and the loading performance of the logical address tag blocks can be improved. Therefore, the time required for the address translation table reconstruction process that needs to load the logical address tag blocks can be shortened.

In addition, since no logical address tag block is included in the data block, these data can be quickly read out when a read request for the plurality of physically continuous data blocks is generated.

Note that in the description of the address translation table reconstruction processing in accordance with the flow chart shown in FIG. 10, for the sake of descriptive convenience, readout of the logical address tag blocks from the disk array 2 is performed for each stripe, and processes based on each logical address tag block in that stripe are serially executed for each block. However, the processes based on each logical address tag block in the stripe may be parallelly processed for each of the disk drives 21 to 24 which construct the disk array 2. This arrangement can further shorten the time required for reconstructing the address translation table 32.

Figure 11:
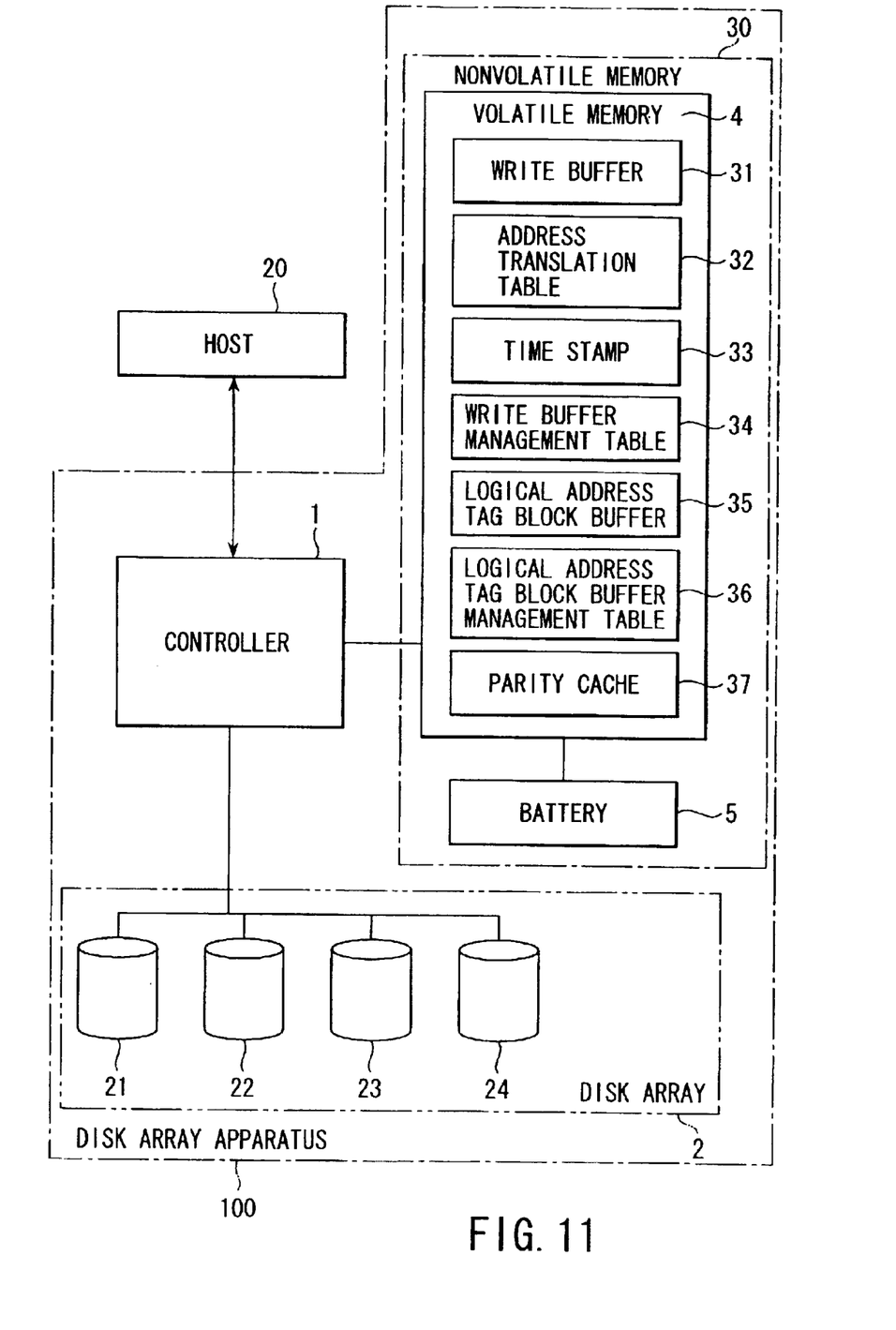
FIG. 11 is a block diagram showing the arrangement of a computer system having a disk array apparatus according to another embodiment of the present invention.

In the embodiment described above, the write buffer 31, address translation table 32, time stamp 33, write buffer management table 34, logical address tag block buffer 35, logical address tag block buffer management table 36, and parity cache 37 are allocated on the nonvolatile memory 3, but the present invention is not limited to this. For example, a disk array apparatus 100 shown in FIG. 11 in which all the components are allocated on a volatile memory 4 may be used. In this case, when the disk array apparatus 100 is to be turned off, the volatile memory 4 must be prevented from erasing its storage contents. For example, the volatile memory 4 may be backed up by using a battery 5, thereby equivalently implementing a nonvolatile memory 30 which corresponds to the nonvolatile memory 3 shown in FIG. 1. That is, the above-described components may be allocated in the nonvolatile memory 30 constituted by the volatile memory 4 and battery 5 (memory backup mechanism). This configuration makes it possible to access the parity cache 37 in higher speed than that in the above-described embodiment.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A disk array apparatus including a disk array constituted by a plurality of disk drives, and wherein data designated by a write request supplied from a host computer is divided into blocks and accumulated in a write buffer, a one-data-stripe data block including logical blocks corresponding to one data stripe is written in physically-consecutive areas of free areas that are different from areas in which to-be-updated data in the disk drives of the disk array is stored, the one-data-stripe data block being written when data containing logical blocks corresponding in number to the one data stripe is accumulated in the write buffer, and the disk drives are accessed, referring to an address translation table used for translating logical addresses into physical addresses, said disk array apparatus comprising:

tag generation means for generating logical address tag blocks containing logical addresses corresponding to all logical blocks included in the data blocks corresponding to one data stripe written in the disk array;

a tag buffer for storing the logical address tag blocks generated by the tag generation means;

parity generation means for, when the disk array is configured to use parity data and logical address tag blocks of stripe units which are smaller in number than the disk drives constituting the disk array by one are stored in said tag buffer, generating parity data containing parity blocks of one stripe unit on the basis of the logical address tag blocks corresponding to the stripe units;

storage means for collectively storing (i) one-stripe-unit parity data generated by the parity generation means and (ii) one-logical-address-tag-stripe data blocks containing logical address tag blocks of stripe units which are smaller in number than the disk drives constituting the disk array by one and which are stored in said tag buffer, said one-stripe-unit parity data and said one-logical-address-tag-stripe data blocks being collectively stored in physically consecutive blocks of the disk drives constituting the disk array, the physically consecutive blocks being included in the logical address tag block areas of the disk array;

acquiring means for, when the logical address tag blocks of one logical address tag stripe have not been stored in the tag buffer after a predetermined time, acquiring parity block data from the logical address tag stripe of the logical address tag blocks corresponding to new logical address tag blocks, the parity block data being acquired by using the logical address tag blocks stored in the tag buffer until the predetermined time as the new logical address tag blocks;

new parity generation means for generating new parity block data on the basis of the parity block data acquired by the acquiring means and data on the new logical address tag blocks; and update means for updating data of the logical address tag stripe corresponding to the new logical address tag blocks and included in the logical address tag block area of the disk array on the basis of the data of the logical address tag blocks and the new parity block data generated by the new parity block generation means.

2. A data updating method for use in a disk array apparatus including a disk array constituted by a plurality of disk drives, and wherein data designated by a write request supplied from a host computer is divided into blocks and accumulated in a write buffer, a one-data-stripe data block including logical blocks corresponding to one data stripe is written in physically-consecutive areas of free areas that are different from areas in which to-be-updated data in the disk drives of the disk array is stored, the one-data-stripe data block being written when data containing logical blocks corresponding in number to the one data stripe is accumulated in the writer buffer, and the disk drives are accessed, referring to an address translation table used for translating logical addresses into physical addresses, said data updating method comprising:

- a step of generating logical address tag blocks containing logical addresses corresponding to all logical blocks included in the data blocks corresponding to one data stripe when the data blocks corresponding to one data stripe are written in the disk array;
- a step of accumulating the generated logical address tag blocks in a logical address tag block buffer;
- a step of generating parity data containing parity blocks of one stripe unit on the basis of the logical address tag blocks corresponding to stripe units, where the disk array is configured to use parity data and when logical address tag blocks of the stripe units which are smaller in number than the disk drives constituting the disk array by one are stored in said logical address tag block buffer;
- a step of correctively storing (i) generated one-stripe-unit parity data and (ii) one-logical-address-tag-stripe data blocks containing logical address tag blocks of stripe units which are smaller in number than the disk drives constituting the disk array by one and which are stored in said logical address tag block buffer, said generated one-stripe-unit parity data and said one-logical-address-tag-stripe data blocks being collectively stored in physically consecutive blocks of the disk drives constituting the disk array, the physically consecutive blocks being included in the logical address tag block areas of the disk array;
- a step of acquiring parity block data from the logical address tag stripe of the logical address tag blocks corresponding to new logical address tag blocks, the parity block data being acquired by using the logical address tag blocks stored in the logical address tag block buffer until the predetermined time as the new logical address tag blocks, when the logical address tag blocks of one logical address tag stripe have not been stored in the logical address tag block buffer after a predetermined time;
- a step of generating new parity block data on the basis of the acquired parity block data and data on the new logical address tag blocks; and
- a step of updating data of the logical address tag stripe corresponding to the new logical address tag blocks and included in the logical address tag block area of the disk array on the basis of the data of the new logical address tag blocks and the new parity block data.

* * * * *